United States Patent [19]
Herreid

[11] Patent Number: 6,090,915
[45] Date of Patent: *Jul. 18, 2000

[54] COLLAGEN OR GELATIN CRUMBLE COMPOSITION AND USES

[75] Inventor: Richard M. Herreid, Austin, Minn.

[73] Assignee: Hormel Foods Corporation, Austin, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,927

[22] Filed: Oct. 18, 1996

[51] Int. Cl.[7] .......................... C07K 14/00; C07K 14/78; B22C 1/00
[52] U.S. Cl. .......................... 530/350; 530/353; 530/354; 530/356; 164/15; 164/525
[58] Field of Search ..................................... 530/353, 354, 530/356, 350

[56] References Cited

U.S. PATENT DOCUMENTS

| | | | |
|---|---|---|---|
| 3,249,106 | 5/1966 | Maeth et al. | 128/3 |
| 3,249,109 | 5/1966 | Maeth et al. | 128/268 |
| 4,064,008 | 12/1977 | Peterson et al. | 195/6 |
| 4,554,169 | 11/1985 | Anderson et al. | 426/576 |
| 4,609,403 | 9/1986 | Wittwer et al. | 106/122 |
| 4,849,141 | 7/1989 | Fujioka et al. | 264/207 |
| 4,995,985 | 2/1991 | Scott et al. | 210/679 |
| 5,084,481 | 1/1992 | Ulrich et al. | 514/557 |
| 5,135,755 | 8/1992 | Czech et al. | 424/455 |
| 5,626,899 | 5/1997 | Payne et al. | 426/574 |

FOREIGN PATENT DOCUMENTS

| | | |
|---|---|---|
| 227 876 | 10/1985 | Germany . |
| 01245074 | 9/1989 | Japan . |
| 1 411 751 | 10/1975 | United Kingdom . |
| WO94/21739 | 9/1994 | WIPO . |

*Primary Examiner*—Michael P. Woodward
*Assistant Examiner*—Anish Gupta
*Attorney, Agent, or Firm*—Merchant & Gould P.C.

[57] ABSTRACT

An animal collagen or gelatin based crumble, and processes for the preparation of the particulate crumble, are useful in the preparation of collagen or gelatin based compositions. The crumble is prepared by extracting animal collagen from an animal tissue source and combining the collagen with sufficient water to form a composition comprising about 15–45 wt % animal collagen and about 0.01–5 wt % of a stabilizer or preservative. Such a combination of materials can be solidified and then processed into a large particulate format. The large particulate comprises a, regular or amorphous shaped, roughly crumbled or roughly divided, crumble product. The typical particle size of a majority of the crumble is about 0.2–5 cm. The crumble is easily manufactured, packaged, stored, handled and distributed. The crumble can be easily used as is. The material melts easily into a use locus. The crumble is also particularly adapted to a use in combination with an aqueous diluent to form an aqueous animal collagen or gelatin solution that have a variety of uses. The aqueous solution of the crumble can be made with minimal heating to dissolve the crumble in the aqueous liquid.

13 Claims, No Drawings

COLLAGEN OR GELATIN CRUMBLE COMPOSITION AND USES

FIELD OF THE INVENTION

The invention relates to a solid water rich collagen or gelatin composition. The composition is in a solid form comprising roughly divided regular or amorphous shapes. The solid collagen or gelatin material is prepared by separating the collagen or gelatin protein from an animal tissue source using an aqueous extraction process at an elevated temperature, forming an aqueous mixture of the collagen composition that will solidify upon cooling, solidifying the aqueous mixture and forming the amorphous or regular solids.

BACKGROUND OF THE INVENTION

Animal proteins derived from tissues remaining after meat packing operations have been a source of useful protein preparations for many years. Collagen or gelatin proteins have been extracted from animal tissues and have been used historically in the preparation of animal glues, food gelatins and other protein based products. Collagen or gelatin preparations typically take the form of a particulate or powdered material. The gelatin powder is often sold in combination with other powdered ingredients that add unique properties or provide new utilities to the preparation.

An animal tissue source or mixtures of such sources are commonly extracted using a heated aqueous mixture. Aqueous mixture forms a solution of the collagen or protein. Such solutions are often dried to form the well known collagen or gelatin powdered material. When used, the gelatin powder is combined with water to reconstitute the hydrated protein. This common hydration-dehydration-hydration processing sequence for forming the gelatin powder and reconstituting gelatin powder into a gelatin aqueous gel has a substantial energy drawback.

In order to convert an aqueous protein extract into a solid particulate material, a substantial amount of heat energy is applied removing water from the aqueous protein composition. The removal of water results in a solid proteinaceous material having about 13 wt % water, or somewhat less, in common gelatin powdered products. The protein solids can then be processed into a finely divided particulate (typically less than 20 U.S. mesh or less than about 0.8 mm or 800 μm) which is then packaged and distributed to end users. An end user taking the particulate protein, typically combines the material with a major proportion of water and, using heat and agitation, rehydrates the protein resulting in a useful material that can be further diluted or combined with other ingredients as necessary. Such typical labor and energy intensive processing steps are well known and have been common for many years.

General gelatin extraction processing is disclosed in Donnelly et al., U.S. Pat. No. 4,043,996; Petersen et al., U.S. Pat. No. 4,064,008; Oudem, U.S. Pat. No. 4,176,117; Müller, U.S. Pat. No. 4,889,920 (which teaches a powdered gelatin having a water content between 8 and 13%); and Moy et al., U.S. Pat. No. 5,459,241. Processes using a caustic pH or an acid pH or both in processing gelatin are disclosed in, for example, Consolazio et al., U.S. Pat. No. 4,374,063 and Nasrallah et al., U.S. Pat. No. 5,210,182. Gelatin derived from a bone or skin source is disclosed in Wojcik, U.S. Pat. No. 4,232,425; Vollmer et al., U.S. Pat. No. 4,402,873; England et al., U.S. Pat. No. 4,427,583; and Grossman et al., U.S. Pat. No. 5,093,474. Processing of a gelatin and glycerol recycled product is shown in Schmidt et al., U.S. Pat. No. 5,288,408. An oxidative process for maintaining the methionine content is shown in Wrathall et al., U.S. Pat. No. 5,412,075. Nishibori, U.S. Pat. No. 5,080,292 teaches a powdered gelatin particulate material. Graesser et al., U.S. Pat. No. 4,369,069 disclose a powdered gelatin product having a desirable content of alpha-gelatin. A gelatin granule or powder having 1–13 wt % water is disclosed in Koepff et al., U.S. Pat. No. 4,992,100. The use of gelatin for binding various types of agglomerates or structures is shown in Cummisford et al., U.S. Pat. No. 4,098,859; Ueda et al., U.S. Pat. No. 4,957,558; Siak et al., U.S. Pat. No. 5,320,157; and Moore et al., U.S. Pat. No. 5,262,100. Berta, U.S. Pat. Nos. 4,867,983 and 4,921,108 teach apparatus and methods for forming GELCAPS® comprising a medication formed in a gelatin encapsulate coating.

One historical use of substantial quantities of collage or gelatin protein is in the form of an animal glue. The use of such a glue was first recorded in about 4000 B.C. Throughout subsequent centuries, glue and crude gelatin extracts with poor organoleptic properties were prepared by boiling bone and hide pieces in a lime solution to cool and gel. Late in the seventeenth century, the first commercial gelatin manufacturing began. At the beginning of the nineteenth century, commercial production methods gradually were improved to achieve the manufacture of high molecular weight collagen extracts with good quality that form characteristic gelatin gels. Animal glues are the hydrolysis product of collagen or gelatin. Such a hydrolysis product is an amorphous collection of protein fragments. One glue precursor is sold in the form of a finely divided solid product comprising a protein powder, containing 11–13 wt % water with certain animal glue additives. When used, the powder is typically diluted with water and combined with additives or agents that exert a control or a change in effect of the gelling properties of the glue. Such agents are commonly used to control gelation and to increase the rate of gelation but not the rigidity of the final gel. Citrates, tartrates and maleates are often used in these animal glue preparations. Typically the amount of gelatin in the final aqueous animal glue preparation is less than 10 wt % of protein on the aqueous glue composition.

Gelatin proteins are also used in food grade flavored gelatin preparations. A food grade flavored gelatin preparation is commonly sold in the form of a powder containing sugar or other sweeteners, preservatives, flavors, dyes, an amount of powdered gelatin (about 5 to 15 wt % based on the gelatin preparation) and a polycarboxylic acid composition used to add both a tart taste and to help in gel formation, etc. The powdered gelatin material is combined with hot water to form a wet gelatin food having a protein content of less than about 5 wt % based on the gelatin food.

The use of gelatin can be based on the combination of properties exhibited by good quality protein. Such properties include reversible gel to sol transition of aqueous solution; a useful range of viscosity of warm aqueous solutions; ability to act as a protective colloid; gel films water permeability; and substantial insolubility in cold water, but complete solubility in hot water. These properties are utilized in food, pharmaceutical, photographic casting and other varied industries. Further, gelatin can form a strong, uniform, clear, moderately flexible coating which can swell and absorb water. Such films can be ideal for the manufacture of photographic articles and pharmaceutical capsules and caplets.

The typical powdered collagen or gelatin product comprising a powdered product, having 13% or less water can be difficult to work and can require substantial energy input for both manufacturing and rehydration. A substantial need exists to improve the composition of the gelatin product to make its use in a variety of industrial processes less energy intensive and more easily accomplished.

BRIEF DISCUSSION OF THE INVENTION

An aqueous gelled gelatin crumble or crumble composition, comprising a major proportion of water and about 15 to 45 wt % of gelatin protein along with other stabilizers, perfumes, dyes, etc., provides a unique, easily manufactured and easily used protein composition. For the purpose of this application, the term "crumb" or "crumble" refers to a solid gelled or gel-like material in the form of relatively large amorphous shaped or regularly shaped particulates. Such a crumble can be a regular molded shape or an extruded prism, cube or cylindrical prism. Such particulates are typically substantially amorphous (non-regular) in shape and the majority of the particulate range in particle size from about 0.2 to 5 centimeters, preferably about 0.5 to 2 centimeters. This particle size is determined by measuring the major dimension of the particle. The major dimension is, in an irregular particle, the largest possible linear measure contained in the mass. The gelatin crumble composition is characterized by relatively low structural integrity. The materials are soft, easily compressed and when subjected to modest mechanical forces, tend to disintegrate into smaller particles. Such modest mechanical force is equivalent to squeezing or rubbing between the fingers of the hand. Such a collagen or gelatin crumble can easily be prepared by extracting animal or collagen protein from an animal tissue source in the form of an aqueous solution, adjusting the concentration of the aqueous solution such that the concentration of the protein is about 15 to 45 wt % preferably about 20 to 40 wt %, more preferably about 30 to 40 wt % of the aqueous solution, adding to the adjusted concentrate appropriate compositions, if needed, and either extruding the crumble or permitting the aqueous composition to set or harden into a gel or other solid form material. This formed gel is easily reduced into a crumble by mechanical action producing the crumble material. The extruded crumble, during handling, commonly is reduced in size and becomes a less regular distribution of sizes and shapes.

When needed, the crumble material can be used as is at a use locus, can be combined with additives and other actives at a use locus or can be readily combined with water or another aqueous solution to form a useful protein solution or suspension. Minor amounts of heat can be used to promote incorporation of the crumble in a use locus or into solution or suspension of the crumble. Such an aqueous solution can be formed at any arbitrary protein concentration by either removal of water by evaporation, reverse osmosis, etc. or by dilution by adding sufficient quantities of water or an aqueous diluent to reach a final protein concentration as desired. Either during the manufacture of the collagen crumble or in its redilution, chemical additives can be added to provide stability to the protein, or provides additional properties or further utilities to the gelatin, protein or collagen preparation.

DETAILED DESCRIPTION OF THE INVENTION

The final step in the conventional standard process for making gelatin is to dry the gelatin to a moisture level of 11–13%. After this drying step the gelatin is often ground to a uniform particle size. The dry gelatin is stable for months or years of storage. Although drying gelatin is convenient for storage, there are some reasons that it is not desirable to dry gelatin. The drying process is a delicate process that must be done carefully to avoid degrading the gelatin quality and can be a source of bacterial contamination. The drying process is also costly in terms of process time, energy requirements and equipment. In addition, the dry gelatin is not readily soluble in water. Dry gelatin dissolves slowly if mixed directly with hot water. The usual process, particularly in industrial applications, is to hydrate the dry gelatin in cold water and then heat the water-gelatin mixture above melting point of hydrated gelatin (usually greater than about 110° F.).

The gelatin crumble was developed to produce a stable form of hydrated gelatin that was less costly to make than traditional dried gelatin. In use the crumble can be melted by heating directly when combined with other ingredients. Melted crumble is ideal for combination in a variety of end uses. The crumble can also be modified to provide an optimum product for a particular final gelatin application. The crumble can be combined with water to form aqueous solutions with minimal heat input or agitation.

Gelatin is not a single chemical substance, but comprises large complex polypeptide molecules derived from the polypeptide collagen molecules. In the parent collagen, eighteen amino acids are arranged in ordered, long chains, each having a molecular weight of about 95,000. The chains are arranged in a rod-like, triple-helix structure consisting of two identical chains called $\alpha_1$ and one slightly different chain called $\alpha_2$. In extracting the protein from an animal source, these chains are partially separated and broken, i.e., hydrolyzed, in the gelatin manufacturing process. Different grades of gelatin have average molecular weight ranging from about 20,000 to about 250,000. Commercial gelatin is a dry vitreous brittle solid, faintly yellow in color, produced in mesh sizes ranging from coarse granules to fine powder. Commercial gelatin contains typically about 9–13% moisture. Most physical and chemical properties of gelatin measured on an aqueous solution are function of the source of collagen, manufacturing methods, extraction conditions, thermal history, pH and the chemical nature of either impurities or additives.

The most useful property of gelatin solutions relates to the reversible heat gel-sol process. When an aqueous solution of gelatin with a concentration of greater than about 0.5 wt % gelatin is cooled to about 35–40° C., an increase in viscosity occurs which ultimately leads to gel formation. The gelation is thought to proceed through a rearrangement stage of individual molecular chains into ordered arrangements, association of two or three ordered segments to create a crystalline phase and stabilization of crystalline phase structure by lateral hydrogen bonding between helical regions.

The basic technology for modern gelatin manufacture was developed in the early 1920's. Acid and lime processes have separate facilities and are typically not interchangeable. In the past, bones and ossein, i.e., decalcified bone, have been supplied by India and South America. In modern production, slaughterhouses and meat packing houses are an important source of bones, skins, and other gelatin raw material. The use of bones and other by-products has greatly increased since the meat packing industry produced packaged and fabricated meats, assisted by the growth of fast food restaurants. Dried and rendered bones yield about 18–22% gelatin while pork skin and related soft tissue also yield about 18–22% gelatin.

In the manufacture of Type A gelatin, the process includes a first maceration of skins, washing to remove extraneous matter, and swelling the material for 10–30 hours in 1–5 wt % hydrochloric, phosphoric, or sulfuric acid. After swelling, four or five aqueous extractions are made at temperatures increasing from 55–65° for the first extract leading to a final 95–100° temperature in a last extraction step. Each extraction step lasts 4–8 hours. The grease by-product is removed, the gelatin solution is filtered for most applications and is deionized to remove calcium, magnesium and other similar di- or trivalent metals. The solution is concentrated typically by continuous vacuum evaporation. The product is then completely dried and the dried gelatin is then ground and blended to specification. Type B gelatin is made mostly from bones with other relatively pure protein sources used. The bones are crushed and demineralized and transferred to large tanks wherein they are combined with a lime slurry. The materials are subjected to a gentle agitation for 3–16 weeks. After washing, the material is acidified to a pH of about 3–6 with an appropriate acid and the material is then extracted in similar stages as done in the acid process.

Both type A and type B gelatins can be used in cosmetics, foods, pharmaceutical products, photographic products, sand core castings and a variety of other applications. Gelatin formulations can be used in dairy products and frozen foods. Gelatin provides a protective colloid property that prevents crystallization of ice and sugar. Gelatin products having a wide range of bloom are used in the manufacture of food products. Examples of such products include ice cream, sour cream, cottage cheese, marshmallows, lozenges, wafers, candy coatings, corned beef, chicken rolls, jellied beef, gummy candies and others.

In pharmaceutical products, gelatin is often used for the manufacture of hard and soft capsules. The formulations are made with water or an aqueous polyhydric alcohol. Gelatin in photographic products is well known as a binder for light sensitive colloids. Lastly, for a variety of applications, chemically reactive groups of gelatin molecules can be modified. Such modifications include deamination of amino groups by nitrous acid, removal of guanidine groups from arginine by oxidation; acylating amino groups and aryl sulfonylating gelatin along with a variety of other types of gelatin modifications.

Sources of Gelatin for the Crumble

Purified gelatin from typical sources such as pork skins, beef skins, or beef bones could be used to make the stabilized crumble. Unrefined gelatin can be extracted from almost any source containing collagen. We have extracted gelatin from rendered pork tissue, beef connective tissue, and residue from mechanically deboned turkey.

The preferred process for making the protein crumble can start with any source of gelatin solution. Low ash, filtered, edible gelatin can be used as well as semi-purified gelatin solution from by-products such as turkey deboning residue, pork tissue, or pig's feet. The type of gelatin liquor is dictated by the final use of the gelatin crumble.

Variations in the Gelatin Crumble

Since the crumble has a high moisture content, they would be likely to spoil because of growing microorganisms. Preservation of the protein material can be attained by refrigeration, freezing, chemical preservation or any combination thereof. If the protein crumble was kept refrigerated or frozen and used within several days it would not need a special preservative. However, with an appropriate preservative, the gelatin crumble can be shipped without refrigeration. We have used a combination of quaternary amine, 4-hydroxy benzoic acid methyl ester, and 4-hydroxy benzoic acid propyl ester to preserve the crumble for the sandcasting and glue manufacturing applications. Edible preservative systems are known and can easily be developed using conventional chemistries. Examples of edible preservatives are acids to lower pH, humectants to lower water activity and additives such as sodium benzoate or hydrogen peroxide. These edible preservatives could be used in various combinations for storage and shipping of the crumble under refrigerated or non-refrigerated conditions. There is quite an array of ingredients that could be added to the gelatin prior to concentration and forming the crumble. Hydrogen peroxide for odor and/or color control or preservation. Iron Oxide for casting core making application. Fragrance to mask an undesirable odor or impart a desirable aroma. Crosslinking agents to increase the melting point, viscosity or bloom of the gelatin. These could include any of the protein crosslinking agents known in the field such as formaldehyde, glutaraldehyde, glyoxal or aluminum sulfate.

The gelatin composition has to be concentrated enough so that the crumble is rigid enough to be shipped without sticking together. This implies a concentration range of about 15–45% solids. The concentration of the gelatin solution can be done by any of several established techniques including evaporation or membrane concentration such as reverse osmosis.

We have chilled the concentrated gelatin by putting it in a 38° F. cooler. The chilled gelatin gels are in blocks which can be chopped or ground into crumble. The gelatin could also be chilled with a scraped surface heat exchange as is commonly done prior to drying gelatin in most commercial gelatin production. The chilled gelatin could then be extruded or ground into crumble. The rough crumble can be sized into one or more products including a desired range of particle sizes. The off-size material can be recycled to the production of the liquid gelatin.

Gelatin Crumble as Raw Material

Gelatin crumble can be considered an enriched raw material for collagen or gelatin materials such as sand core binders, glue, cosmetic proteins, and gelatin.

One preferred use for the gelatin crumble of the invention involves forming sand core molds suitable for use in aluminum or ferrous metal casting processes. One application of such sand casting is the manufacture of automobile engine blocks and similar cast metal (aluminum, iron, etc.) objects. A conventional sand core binder is typically manufactured by blending a particulate material such as sand with a dry gelatin binder composition. The typically powdered gelatin binder can also contain useful preservatives or other functional materials that can aid in the formation of the cast shape or can aid in the easy removal of the cast shape from the then formed metal object. After the sand gelatin blend is made, water is added to the mixture to form a gelatin binder colloid. The colloid is then added to a mold to obtain a particular shape, the gelatin binder is then cured and used in the metal casting process.

The convenient use of the crumble of the invention is an advantage in sand casting. The gelatin binder crumble easily melts when combined with heated sand and forms a stable mold or core. The gelatin binder adheres the core sand together such that the core is characterized by a closely-packed particulate structure having structural strength which is sufficient to permit ordinary handling procedures within a foundry environment. The core has sufficient hot strength to be structurally capable of withstanding the high pressures associated with squeeze casting processes.

Importantly, cores made with gelatin crumble binders may include the addition of a ferric compound in quantities of less than about 1 weight percent. More preferably, the ferric compound is ferric oxide ($Fe_2O_3$) in amounts from about 0.01 or more preferably, about 0.02 to about 0.2 weight percent, or ferric phosphate ($FePO_4.H_2O$) or ferric pyrophosphate ($Fe_4(P_2O_7)_3.xH_2O$) in amounts up to about 0.5 weight percent. The iron within each compound serves to catalyze the oxidative breakdown of the proteinaceous binder and promotes sand removal. Because the ferric compound is water insoluble, it can be added at any convenient time, such as being mixed in with the sand or mixed in with the preferred gelatin crumble prior to being added to the sand. In forming the sand core, the particulate sand material comprises a major proportion of the particulate sand or zirconium material, about 0.5 to about 10% of the gelatin crumble (which brings along a substantial proportion of water). The sand can also contain 0.01 to about 1 wt % of a variety of additive compositions including ferric material that can be useful in sand removal at the end of the casting process.

The sand crumble mixture is heated to a temperature of about 60° C. to about 70° C. prior to introduction into the core mold cavity so as to facilitate the filing of the cavity. Otherwise, the mixture may be introduced into the cavity at room temperature. The mold may also be preheated or heated after the mixture has been injected into the cavity. After compaction and void removal, the mixture is cured at a temperature of about 70° C. to about 80° C., by any known means, such as infrared irradiation, radio frequency induction or microwave irradiation. During heating the mixture can be dehydrated conventionally.

Other uses that would benefit from a pre-hydrated gelatin which would be ready to process or a semi-refined raw material could include coating or sizing paper or textiles; raw material for hydrolyzed collagen production either for cosmetic or edible applications; candy such as gummy bears, especially if additives such as glycerol and sugar are added before making the crumble; pharmaceutical hard or soft capsules, etc.

EXAMPLE 1

Gelatin was extracted from pork tissue (adipose tissue that remains after low temperature rendering to remove the fat from pork fatty materials). The pork tissue was mixed with water and heated to about 180° F. The mixture was acidified to about pH 3.5 with sulfuric acid. After mixing at this temperature and pH for about an hour, the mixture was centrifuged to separate the gelatin liquor from the remaining solids.

The gelatin liquor was neutralized to about pH 6. Preservatives consisting of methyl and propyl p-hydroxybenzoate and quaternary amine were added to the gelatin liquor. The gelatin solution was divided into aliquots and treated as in Table 1.

TABLE 1

| Sample # | Neutralizer | Additive |
| --- | --- | --- |
| 1A | Sodium Hydroxide | None |
| 1B | Sodium Hydroxide | Hydrogen Peroxide |
| 1C | Sodium Hydroxide | Iron Oxide |
| 1D | Calcium Hydroxide | None |

The gelatin mixtures were concentrated to 40% solids and chilled to form a gel which was chopped to pieces ranging from 2 mm to 12 mm (⅛" to ½") in size. These crumbles were stable when stored at room temperature.

The crumbles were used to form test metal casting cores by mixing them directly with hot sand. The hot sand melted the gelatin directly so that the gelatin coated the sand particles to serve as a binder in the core making process.

The cores made with the gelatin crumbles were equivalent to cores made with conventional dry gelatin powder. The process using dry gelatin involves mixing the dry gelatin with cold water for rehydration followed by heating to produce a gelatin solution. The gelatin solution is then mixed with hot sand to coat the sand particles.

The results of core strength tests made with gelatin crumbles and dry gelatin indicate the crumbles produce core strengths similar to or greater than dry gelatin (Table 2).

TABLE 2

| Sample # | 1A | 1B | 1C | 1D | Dry Gelatin |
| --- | --- | --- | --- | --- | --- |
| Core Hardness | 238 | 225 | 286 | 402 | 250 |

EXAMPLE 2

Gelatin from Pork Tissue—Crumbles Ground in Several Sizes

Gelatin was extracted from pork tissue (adipose tissue that remains after low temperature rendering to remove the fat from pork fatty materials). The pork tissue was mixed with water and heated to about 180° F. The mixture was acidified to about pH 3.5 with sulfuric acid. After mixing at this temperature and pH for about an hour, the mixture was centrifuged to separate the gelatin liquor from the remaining solids.

The gelatin liquor was neutralized to about pH 6 with sodium hydroxide. Preservatives consisting of hydrogen peroxide, methyl and propyl p-hydroxybenzoate, and quaternary amine were added. The gelatin solution was evaporated to about 35% solids.

The gelatin mixture was cooled to form a gel which was ground through a grinder with plates of ¼", ½", and ¾". The particle size distribution was as follows:

| | Grind Size | | |
| --- | --- | --- | --- |
| Sieve Size | ¾" (2 cm) | ½" (1.2 cm) | ¼" (0.6 cm) |
| >1.0" (>2.5 cm) | 0% | 0% | 0% |
| 0.5"–1.0" (1.3–2.5 cm) | 17% | 3% | 0% |
| 0.375"–0.5" (0.95–1.3 cm) | 24% | 24% | 0% |
| 0.250"–0.375" (0.6–0.95 cm) | 25% | 37% | 35% |
| 0.187"–0.250" (0.47–0.6 cm) | 9% | 13% | 30% |
| 0.132"–0.187" (0.33–0.47 cm) | 7% | 11% | 21% |
| 0.066"–0.132" (0.17–0.33 cm) | 6% | 10% | 12% |
| <0.066" (<0.17 cm) | 2% | 3% | 2% |

These gelatin crumbles were stable when stored at room temperature.

EXAMPLE 3

Gelatin from Pork Skins—Crumbles Used to Make a Collagen Drink Concentrate

Gelatin was extracted from acidified pork skins following conventional methods. The dilute gelatin solution was clarified by filtration and partially concentrated by ultrafiltration. Sodium benzoate was added at 0.33% of the solids concentration. The pH was adjusted to 5.0 with citric acid and the solution was concentrated to 30% solids. The concentrated gelatin was chilled and ground through a ¼" plate. The gelatin crumbles were stored at 4° C. for several weeks before being used to make a strawberry flavored collagen drink concentrate.

To make the drink concentrate the gelatin crumbles were melted directly in a heated kettle. The pH was adjusted to 6.0 with sodium hydroxide and the temperature adjusted to 120° F. A neutral protease enzyme was added at 0.5% based on the solids. After hydrolyzing the gelatin the enzyme was inactivated by heating the solution to 185° F. The pH was adjusted to 3.9 with citric acid. Red #40 (0.08%) and strawberry flavor (0.9%) were added with mixing.

The strawberry flavored collagen drink was prepared by diluting two tablespoons of the concentrate in 8 oz. of cold water. The resulting drink was equivalent in color, flavor, and clarity to collagen drink made from conventional dry gelatin.

EXAMPLE 4

Gelatin from Pork Skins—Crumbles Used as an Ingredient in Gummi Candy

Gelatin was extracted from acidified pork skins following conventional methods. The dilute gelatin solution was clarified by filtration and partially concentrated by ultrafiltration. The following ingredients were dissolved in the gelatin solution.

| | |
|---|---|
| Gelatin solution (11.4% solids) | 2000 g |
| Sorbitol | 58 g |
| Sodium Benzoate | 0.76 g |

This solution was concentrated by evaporation to about 35% solids. The concentrated gelatin was chilled and ground through a ¼" plate to make gelatin crumbles.

The crumbles were used as ingredients to make Gummi candy using the following recipe (from "Great Recipes made Easy with Gelatin" Gelatin Manufacturers Institute of America p2).

Mixed 300 g sugar, 354 g 42DE Corn Syrup, and 70 g water. Cooked this mixture with stirring until it reached 240° F. Cooled the mixture to 200° F. and added 246 g of the gelatin/sorbitol crumbles directly to the hot sugar mixture with stirring. The crumbles melted rapidly and formed a clear solution with the sugar mixture. Added a mixture of 15 g water, 15 g citric acid, 0.1 g Red #40 coloring, and 0.4 g strawberry flavor. The finished gummi candy was poured onto a sheet dusted with corn starch, allowed to cool, and cut into shapes.

The gummi candy had typically flavor, color, and texture.

EXAMPLE 5

Gelatin From Pork Tissue—Crumbles Used as an Ingredient in Glue Manufacture

Gelatin was extracted from pork tissue (adipose tissue that remains after low temperature rendering to remove the fat from pork fatty materials). The pork tissue was mixed with water at the rate of 1 part tissue to two parts water and heated to about 180° F. The mixture was acidified to about pH 3.5 with sulfuric acid. After mixing at this temperature and pH for about an hour, the mixture was centrifuged to separate the gelatin liquor from the remaining solids.

The gelatin liquor was neutralized with calcium hydroxide. Preservatives consisting of hydrogen peroxide, methyl and propyl p-hydroxybenzoate, and quaternary amine were added. The gelatin solution was evaporated to about 40% solids.

The gelatin solution was chilled to form a gel which was chopped to crumbles ranging from ⅛" to ½" in size. These crumbles were stable when stored at room temperature.

The gelatin crumbles were used to make glue by melting them directly and heating to 160° F. Conventional wetting agents, and bleach were mixed with the gelatin solution. Glycerin, sugar, and magnesium sulfate were then added to the gelatin solution. The mixture was chilled to form finished glue.

EXAMPLE 6

Gelatin From Turkey Bone Residue—Crumbles Used to Make Hydrolyzed Cosmetic Protein Gelatin was extracted from turkey bone residue (bone residue from mechanical separation of turkey meat from turkey frames). The bone residue was mixed with water and heated to about 180° F. The mixture was acidified to about pH 3.5 with phosphoric acid. After mixing at this temperature and pH for about an hour, the mixture was neutralized with calcium hydroxide and centrifuged to separate the gelatin liquor from the calcium phosphate and remaining bone residue.

Preservatives consisting of methyl and propyl p-hydroxybenzoate and quaternary amine were added. The gelatin solution was evaporated to about 40% solids and cooled to form a gel. The gel was chopped to crumbles ranging from ⅛" to ½" in size. These crumbles were stable when stored at room temperature.

To make a hydrolyzed collagen solution from the gelatin crumbles, they were melted in a heated flask and warmed to 140° F. Papain was added to the gelatin solution which was held at 140° F. for two hours. The solution was then heated to 190° F. to inactivate the papain and filtered to produce a clear solution. The solution was evaporated to approximately 50% to give an amber solution which was suitable for use as a hydrolyzed protein ingredient in shampoos and other personal care products.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A hydrated solid protein crumble composition, the solid crumble comprising a composition in the form of a plurality of non-regular shaped particulates comprising:

(a) about 15–45 wt % animal protein; and (b) about 40–85 wt % water;

wherein the crumble melts at common gelatin processing temperatures and has a distribution of particle sizes such that 95% of the crumble has major dimension between about 0.2 cm to about 5 cm.

2. The crumble of claim 1 wherein the crumble comprises about 0.01–5 wt % of a preservative.

3. The crumble of claim 1 wherein the animal protein comprises a collagen protein.

4. The crumble of claim 1 wherein the animal protein comprises gelatin.

5. The crumble of claim 4 in the form of an amorphous shaped solid having a major dimension of at least 0.5 cm.

6. The crumble of claim 4 in the form of a cylindrical extrudate having a length of about 1 cm to 5 cm and a diameter of about 0.2 to about 2 cm.

7. The crumble of claim 3 wherein the crumble comprises about 25–35 wt % of gelatin.

8. The crumble of claim 1 additionally comprising an inorganic salt.

9. The crumble of claim 1 additionally comprising an food quality polyhydroxy compound.

10. The crumble of claim 9 wherein the polyhydroxy compound comprises glycerol.

11. The crumble of claim 9 wherein the polyhydroxy compound comprises sorbitol.

12. The crumble of claim 2 comprising a benzoate preservative.

13. The crumble of claim 8 wherein the inorganic salt comprises a ferric salt.

* * * * *